Patented Feb. 11, 1936

2,030,073

UNITED STATES PATENT OFFICE 2,030,073

ADHESIVE COMPOSITION AND PROCESS FOR MAKING SAME

Gordon G. Pierson, Lansdale, Pa., assignor to Perkins Glue Company, a corporation of Delaware No Drawing. Application March 22, 1930, Serial No. 438,244. Renewed March 16, 1935

13 Claims. (Cl. 87—17)

This invention relates to an adhesive composition and to a process for making it. It is more particularly directed to a composition and process employing cassava flour or the like.

Cassava flour as it appears on the market is not a uniform product. The characteristics in which it lacks uniformity include those which give it its useful properties in the manufacture of glues for use in the wood-working industry. Formerly in order to produce a glue having the proper body and other desirable characteristics, a cassava flour was chosen having a viscosity in excess of the viscosity required in the finished glue and by means of oxidizing agents or acids added to a water suspension, the flour was modified as nearly as possible to the desired point. Thereafter the flour was separated and dried. Due to the fact that such viscosity-reducing agents as acids and oxidizing materials produced irregular results through unknown causes, this process required a great deal of attention and time and since it was a wet batch process, much equipment, power and heat was required before the flour could be recovered in the dry condition.

Both the lower grade or cheaper flours and the higher grade or more expensive flours possess some desirable characteristics but also possess some undesirable characteristics for the manufacture of glues. Tabulation showing the desirable and undesirable characteristics used found in the low and high grade flours and the optimum characteristics desirable for the general glue-using trade are shown approximately as follows:

with the procedure given in the preferred example below and without any treatment with a modifying agent.

By careful blending of various types of flour, including both low and high grade flours, it is possible to prepare a mixture capable of giving a glue having many of the desirable characteristics. This method, however, requires a large assortment of various types of flours and much careful testing in order to produce a flour having even an approach to the optimum characteristics desired. Even when such carefully blended flour was employed with acids or oxidizing agents as described above, the result was not uniform and satisfactory.

The principal object of the present invention accordingly is to do away with disadvantages heretofore encountered in the preparation of glues from cassava and like flours and to provide a simple efficient process which may be inexpensively and expediently carried out using easily procurable raw materials, and to provide a substantially uniform composition thereby having about the optimum characteristics given above.

The invention comprises the novel compositions and component mixtures comprised in such compositions, as well as the novel processes and steps of processes according to which such compositions may be manufactured, specific embodiments of which are described hereinafter by way of example only and in accordance with what I now consider the preferred manner of practicing the invention.

Table

| Characteristics | High-grade flours | Low-grade flours | Optimum desirable for general use |
|---|---|---|---|
| Strain on mixing equipment during cooking. | Much | Little | Little. |
| Glue fiber | Long | Short | Long. |
| Flow | Slow | Fast | Fast. |
| Glue appearance | Clear and clean | Muddy and granular | Clear and clean. |
| Body of glue ready for use | Too heavy for good spreading. | Too soft. Tends to produce starved joints. | Easy to spread but heavy enough to prevent excessive penetration. |
| Retention of body on standing. | Soon becomes very tough and short. | Soon becomes short | Remains liquid and free flowing. |
| Viscosity at 80° F | 50,000 to 65,000 poise | 35,000 to 50,000 poise | 44,000 to 48,000 poise. |
| Odor of glue | Nearly odorless | Musty | Slightly fragrant. |
| Time required to agitate glue to a good workable consistency. | 3 to 4 hours | 2 to 3 hours | 1½ to 2½ hours. |
| Hardness on tools | Not hard | Usually hard | Not hard. |
| Flour color and crunch | Good | Poor | Good. |

The characteristics, regarding high and low grade flours, mentioned in the above table are those obtained by treating flours in accordance I have found in accordance with my invention that when very small quantities of a copper salt such as a sulphate, chloride or nitrate of copper are mixed with dry raw flour having a viscosity above 48,000 poise, or with a water suspension of flour under proper conditions, a resulting glue is obtained possessing the desired optimum properties, described in the above table. It will be noted that the viscosity given as that desired for the optimum viscosity in the above table, is within the range 44,000-48,000 poise. This range of viscosity is secured by the treatment with the copper salt and in this connection I have discovered a peculiar and hitherto unknown fact concerning treatment of raw cassava starch, namely, that a starch having a viscosity greater than 48,000 poise when treated in accordance with my invention acquires a viscosity range of 44,000 to 48,000 poise no matter how high the viscosity of the original untreated starch is. The viscosity referred to is that obtainable upon carrying out the viscosity tests using the McMichael viscosimeter which will be described in detail below.

In carrying out the invention in its preferred form, I take 100 pounds of an unblended cassava starch known in the trade as Krebet #1 having a good color and crunch, and having a viscosity when tested as indicated below in the McMichael viscosimeter of about 60,000 poise. This material is a high grade flour. If used, however, as a glue without treatment in accordance with my invention, it would not have the characteristics set forth under the table above under the heading "Optimum desirable for general use". In order to produce these characteristics, I add to the flour approximately .03 pound of finely ground dry copper sulphate in the form of the salt known as blue vitriol, and thoroughly mix the dry starch with this blue vitriol powder. Thereafter in order to produce a glue satisfactory for general use and having the optimum desirable characteristics mentioned in the above table, I mix 100 parts of the mixture of copper sulphate and starch as prepared above with about 200 parts by weight of water. I then add slowly 3 parts of caustic soda dissolved in 15 parts of water. The mixture is then heated with stirring to a temperature of about 150° F. or until the starch has been bursted or gelatinized. The mixture is then stirred and cooled until the desired temperature and consistency has been obtained. From about 1½ to 2½ hours of good agitation during the cooking and cooling periods is required to get the glue in a good workable condition. The order of adding the ingredients may be varied. The copper salt may be added simultaneously with the caustic or thereafter if desired.

I have found that during the process of preparing this glue, little strain on the mixing equipment occurs, the glue as produced has a long fibre, is fast flowing and is clear and clean. It retains its body and remains liquid and free-flowing on standing. It is easy to spread but is heavy enough to prevent excessive penetration into the wood or other surface to which applied. It is slightly fragrant. When this glue is tooled, it does not cause excessive dulling of the tools. The viscosity of the glue is within the range 44,000-48,000. The glue thus has the optimum desirable characteristics for general use mentioned above. Instead of copper sulphate, an equivalent quantity of copper nitrate or chloride may be used for producing the result desired. A little more or less of the copper salt does not appreciably change the final result. I have found that I may use upwards of 2/10% of copper sulphate for example, or an equivalent amount of other copper salts to secure the results desired. I prefer not to go beyond this upper percentage because with larger quantities the glue takes on an unpleasing green color and because larger quantities produce a short and lumpy consistency in the glue which is undesirable. Cassava starch having a different viscosity from that mentioned in the example just given may of course be employed. As previously stated, if the viscosity is above the range 44,000-48,000, the treatment with the copper salt will result in a glue product having a viscosity within the range 44,000 to 48,000. If the starch employed has originally a viscosity of less than the range 44,000 to 48,000, it does not appear that the treatment with the copper salt results in a substantial alteration of the viscosity of the glue produced. The beneficial effects brought about by the copper salts are apparently regardless of the method or amount of water used to convert the base into glue. The methods and viscosities are given for a 2⅛:1 mix because such mixture corresponds to the usual trade practice.

Instead of mixing the copper sulphate or other copper salt in dry condition with the dry cassava starch, the copper sulphate, caustic alkali and water in about the proportions indicated in the example above, may all be added together. The mixture is then heated with stirring to a temperature of about 150° F. or until the starch has been bursted or gelatinized. The mixture is then stirred and cooled until the desired temperature and consistency has been obtained. From about 1½ to 2½ hours of good agitation during the cooking and cooling periods is required to get the glue in a good workable condition.

The process for producing the base and glue is a simple efficient one and results in great economies as contrasted to the old process using acids and alkalis as modifying agents which require water, large quantities of chemicals, tanks, centrifugals, and dryers and consumed from 1 to 2 weeks' time. By the present process only the dry mixing of the flour with an inexpensive chemical to produce the base, is required. The action of the chemical is absolute and always produces glue having the optimum viscosity and workability provided the viscosity of the untreated flour is in excess of the desired viscosity.

The principal effect produced by the copper salt appears to be a kind of specific liquefying action whereby a flour which alone would produce a tough difficult working glue will in combination with the copper salt produce a fluid and easy-working glue, while another flour which alone would produce a glue having the proper fluidity and workability or which would produce a fluid and easy-working glue could not be changed in these respects by the action of the copper salt. The principal effect brought about by the copper salt in the latter case would be that of keeping the resulting glue permanently liquid or eliminating to a considerable extent stiffening up of the jelly which occurs in most untreated glues after agitation has been discontinued.

The viscosity figures mentioned herein are values which are obtainable by testing the glue at 80° F. in the McMichael viscosimeter, the glue being prepared in a factory size mixing kettle employing the following standard procedure:

(1) Add 197.5 parts of water to a jacketed kettle having steam and water connections.

(2) Add 100 parts of starch and stir to break up lumps.

(3) Slowly add 3 parts of caustic soda dissolved in 15 parts of water.

(4) Heat with agitation to a temperature of 150° F. consuming 45 minutes for this cooking.

(5) Turn on cooling water in jacket and continue agitation for 2 hours and 15 minutes at the end of which the glue should be 80° F. and ready for testing in the viscosimeter.

While the invention has been described in detail with respect to certain preferred examples thereof which have given satisfactory results, it will be understood by those skilled in the art after understanding the invention, that various changes and modifications may be made without departing from the spirit and scope of the invention and it is intended therefore in the appended claims to cover all such changes and modifications.

What I claim as new and desire to secure by Letters Patent is:—

1. A glue base comprising dry raw cassava or like starch in major proportions and containing a small proportion of a copper salt.

2. A glue base comprising chiefly dry raw cassava or like starch having a viscosity when tested as herein described outside of the range 44,000 to 48,000 poise mixed with a small quantity of a dry copper salt.

3. A glue base comprising chiefly raw cassava or like starch mixed with a small proportion of dry copper sulphate.

4. A glue base comprising chiefly raw cassava or like starch having a viscosity when tested as herein described outside of the range 44,000 to 48,000 poise mixed with a small quantity of dry copper sulphate.

5. A glue base comprising chiefly raw cassava or like starch having a viscosity when tested as herein described outside of the range 44,000 to 48,000 poise mixed with about .03% of dry copper sulphate.

6. A glue comprising chiefly cassava or like starch mixed with a dry copper salt, caustic alkali and water.

7. A glue comprising chiefly raw cassava or like starch having a viscosity when tested as herein described, outside of the range 44,000 to 48,000 poise mixed with a dry copper salt, and treated with caustic alkali and water, and having a resulting viscosity of less than 48,000 poise.

8. A glue comprising chiefly raw cassava or like starch having a viscosity when tested as herein described, outside of the range 44,000 to 48,000 poise treated with a small quantity of copper sulphate, caustic alkali and water, and having a resulting viscosity of less than 48,000 poise.

9. A glue comprising chiefly raw cassava starch having a viscosity when tested as herein described, above 48,000 poise, treated with approximately .03% of copper sulphate, about 3% of caustic soda and about 212% of water having a resulting viscosity approximately within the range of 44,000–48,000 poise.

10. A process for preparing glue base which comprises, mixing as a chief constituent dry, raw, cassava or like starch with a copper salt, and combining the starch and copper salt with a caustic alkali and water.

11. A process for preparing glue which comprises, mixing as a chief constituent a raw cassava or like starch having a viscosity when tested as herein described outside the range of 44,000–48,000 poise with a dry copper salt, and combining the starch and copper salt with a caustic alkali and water in the proportion of about 2⅛ times as much water as starch and agitating and heating the mass until a glue having a viscosity when tested as herein described of less than 48,000 poise is obtained.

12. A process for preparing glue which comprises, mixing as a chief constituent dry raw cassava starch having a viscosity greater than 48,000 poise when tested as herein described with a small amount of dry copper sulphate, combining the starch and copper sulphate with water and caustic alkali in the proportion of about 2⅛ times the weight of the starch as water and about 3% of caustic soda, heating the mass to about 150° F. and stirring for 1½ to 2½ hours, whereby a glue having a viscosity of about 44,000–48,000 poise is obtained.

13. A glue base consisting chiefly of cassava starch having a viscosity above the range 44,000 to 48,000 poise, mixed with a copper salt and which when mixed with sufficient caustic alkali and 2–3 parts of water will produce a glue of a viscosity in the range 44,000 to 48,000 having the strength of animal glue and suitable for gluing wood.

GORDON G. PIERSON.